J. F. LINS.
EXTRACTOR.
APPLICATION FILED JAN. 17, 1918.
1,266,030.
Patented May 14, 1918.
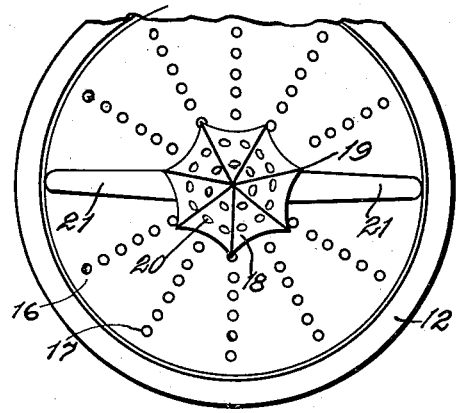
*Fig. 2.*
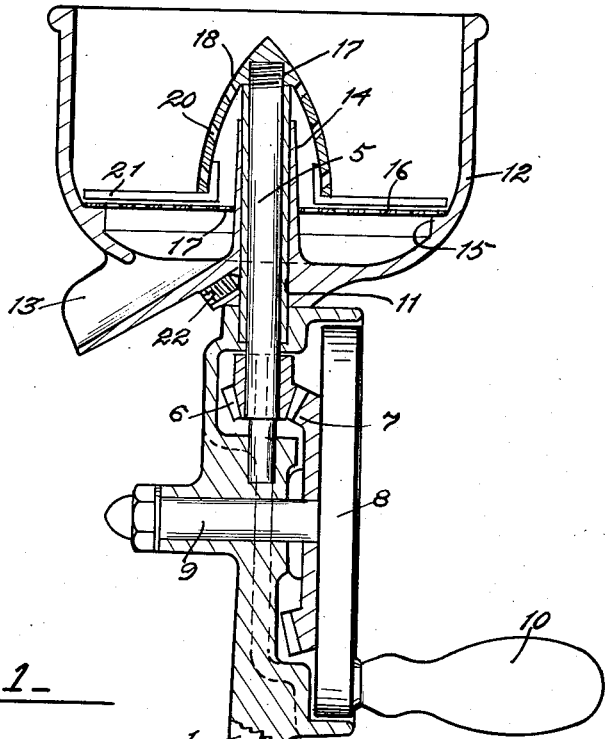
*Fig. 1.*
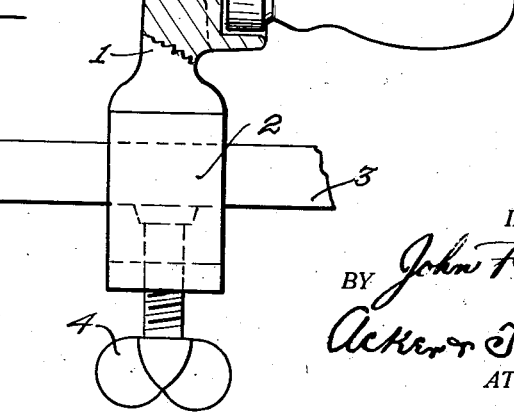
WITNESS:
Wm F. Drew
INVENTOR.
BY John F. Lins
Acker & Tollin
ATTORNEYS.

UNITED STATES PATENT OFFICE.

JOHN F. LINS, OF SAN FRANCISCO, CALIFORNIA.

EXTRACTOR.

1,266,030.      Specification of Letters Patent.      Patented May 14, 1918.

Application filed January 17, 1918. Serial No. 212,193.

*To all whom it may concern:*

Be it known that I, JOHN F. LINS, a citizen of Canada, residing in the city and county of San Francisco and State of California, have invented certain new and useful Improvements in Extractors, of which the following is a specification.

This invention relates to fruit juice extractors and has for its principal object to provide an apparatus capable of quickly and cheaply extracting the juices from lemons, oranges and the like fruits.

The principal object of the invention is to provide an improved form of extractor for the extraction of the juice therefrom, which will permit a portion of the juice to pass through the cone and be received in the bowl or receptacle, the removed pulp passing exteriorly of the cone and being received on a strainer which further separates the juice therefrom, whereby the juice passes from the bowl or receptacle in a strained condition and without being clouded to any great extent by the heavy pulp.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Figure 1 is a vertical sectional view of the preferred embodiment of my invention.

Fig. 2 is a top plan view.

Referring more particularly to the several views of the drawings, wherein like characters of reference designate corresponding parts, 1 indicates a suitable frame having at the lower portion thereof an offset 2 for passing around the edge of a table or support 3, the frame being removably mounted on the support by the adjustment of the threaded thumb screw 4.

Rotatably mounted in the upper portion of the frame 1 is a vertically disposed driving spindle 5 carrying on its lower end a pinion 6 having engagement with the beveled gear 7 carried by a drive wheel 8, the wheel being rotatably supported on the shaft 9 extending transversely through the frame 1. An operating handle 10 is secured to the wheel 8 to enable the same to be rapidly rotated to revolve the spindle 5. The spindle extends upwardly through and to a point beyond the end of a collar 11 carried by the frame 1, and adapted to fit over said collar is a bowl or receptacle 12 of suitable flaring configuration and provided in its base with the outlet or discharge spout 13. Extending centrally upwardly through the bowl or receptacle 12 is a sleeve 14 surrounding the collar 11 and terminating short of the end thereof, said sleeve preventing the escape of the extracted juice from the bowl around the collar 11 and shaft 4.

Adjacent the base of the bowl or receptacle 12 are provided the seats 15 on which is supported the peripheral edge of a strainer 16 provided with a central opening 17 and fitted over the sleeve 14 to lie within the bowl or receptacle at a point slightly above the base thereof and above the outlet 13.

The upper end of the shaft 5 is preferably threaded, as at 17, and the same is received in a suitable threaded socket in the under surface of the apex of a hollow extractor cone 18, which is provided with the ribs 19, and is formed in its peripheral wall with the downwardly and inwardly inclined ports 20 for the escape of the juice of the fruit extracted therefrom.

Suitable blades 21 extend laterally from opposite sides of the peripheral edge of the base of the cone 18 and lie in slight frictional contact with the upper surface of the strainer 16, thereby agitating any pulp received on the strainer and breaking the same up to permit the escape of the juices from the cells thereof.

In the operation of my device, rotation is imparted to the extractor cone 18 by the operation of the wheel 8 and as the fruit, after being preferably halved, is placed downwardly onto the cone under slight pressure, the free juice in the cells thereof preferably passes through the ports 20 and downwardly through the opening 17 into the base of the bowl, escaping therefrom through the outlet 13.

As pressure is applied to the fruit and the same is forced downwardly on the cone 18 to remove the pulp therefrom, said removed pulp passes downwardly over the exterior of the cone 18 and rests on the strainer 16, it being agitated thereon to break up the cells thereof to release the juice by the movement of the blades 21. A set screw 22 may be employed to removably retain the bowl on the collar 11.

It will be apparent that when it is desired to clean the apparatus the cone 18 may be removed from the shaft 5 by unthreading the same which permits the removal of the strainer 16 for the cleaning thereof, and at this time, if desirable, the set screw 22 may be released, enabling the bowl 12 to be removed for the cleaning or sterilizing thereof.

Having thus described my invention, what I claim as new and desire to protect by Letters Patent is:

1. In a fruit juice extractor, the combination with a bowl or receptacle provided with an open top and further provided with an outlet at its base, a rotatable shaft extending upwardly therethrough, an extractor cone carried thereby, a strainer removably positioned in the base of said receptacle above the outlet therein and surrounding said shaft at a point below said cone, and an agitator arm radiating from the base of said cone for contacting with the surface of said strainer to agitate the pulp received thereon.

2. In a fruit juice extractor, the combination with a bowl or receptacle provided with an open top and further provided with an outlet at its base, a rotatable shaft extending upwardly therethrough, a hollow extractor cone provided with ports in the wall thereof communicating with the interior of said cone, a strainer removably positioned in the base of said receptacle above the outlet therein and surrounding said shaft, said strainer provided at a point beneath said cone with an opening to permit the passage of the juice passing through said ports therethrough, and an agitator radiating from the base of said cone for contacting with the surface of said strainer to agitate the pulp received thereon.

In testimony whereof I have signed my name to this specification in the presence of a subscribing witness.

JOHN F. LINS.

Witness:
  D. B. RICHARDS.